UNITED STATES PATENT OFFICE.

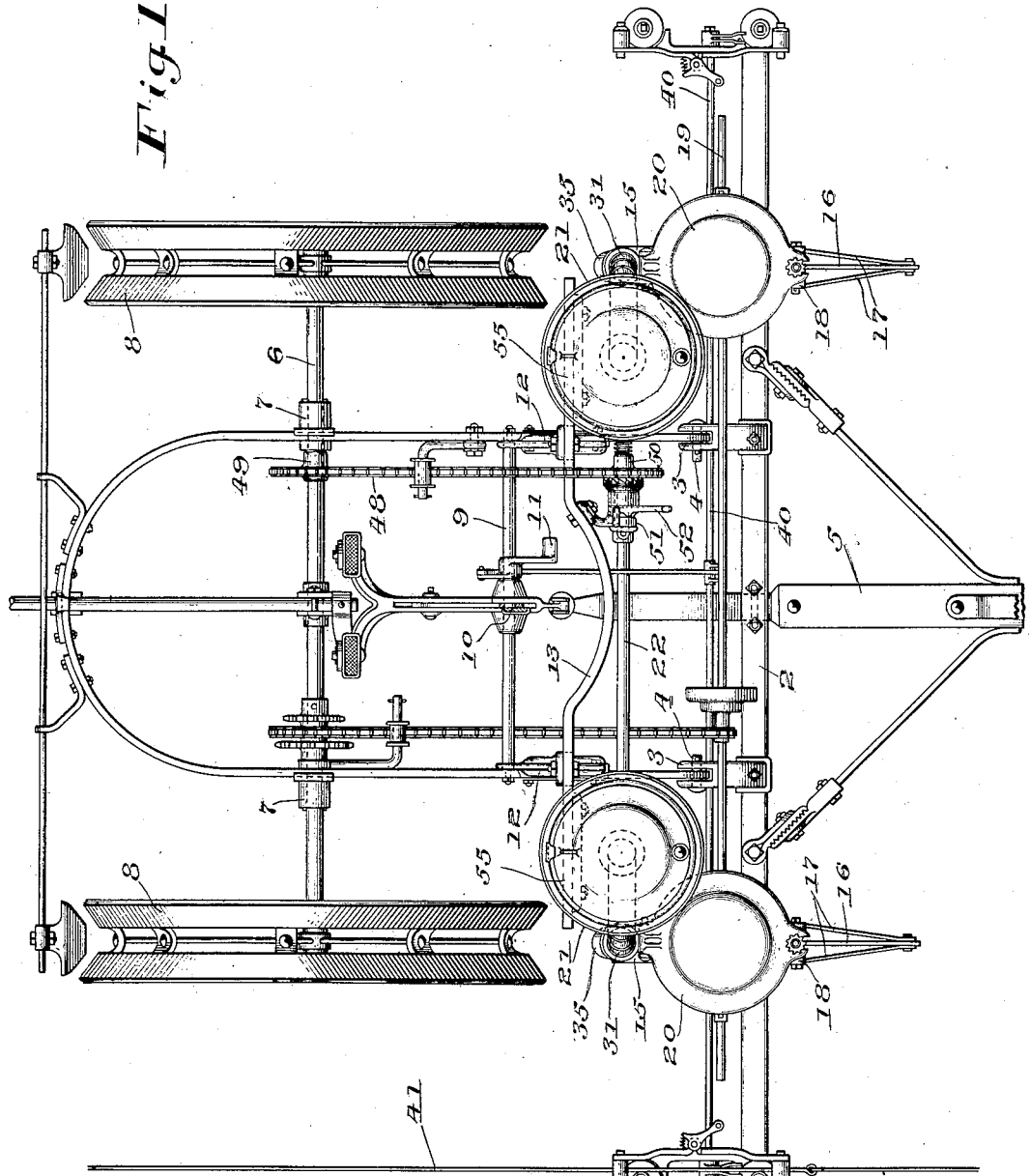

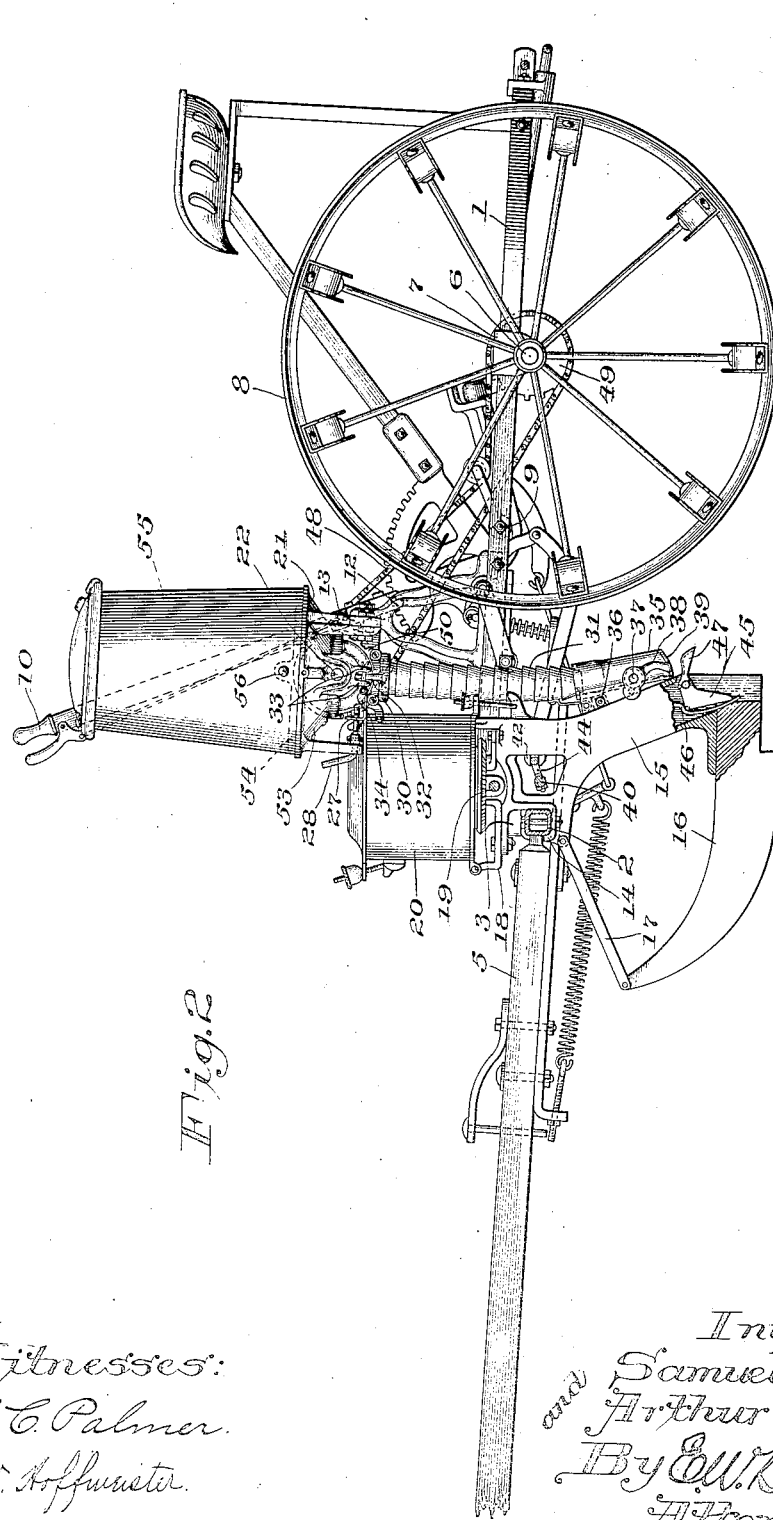

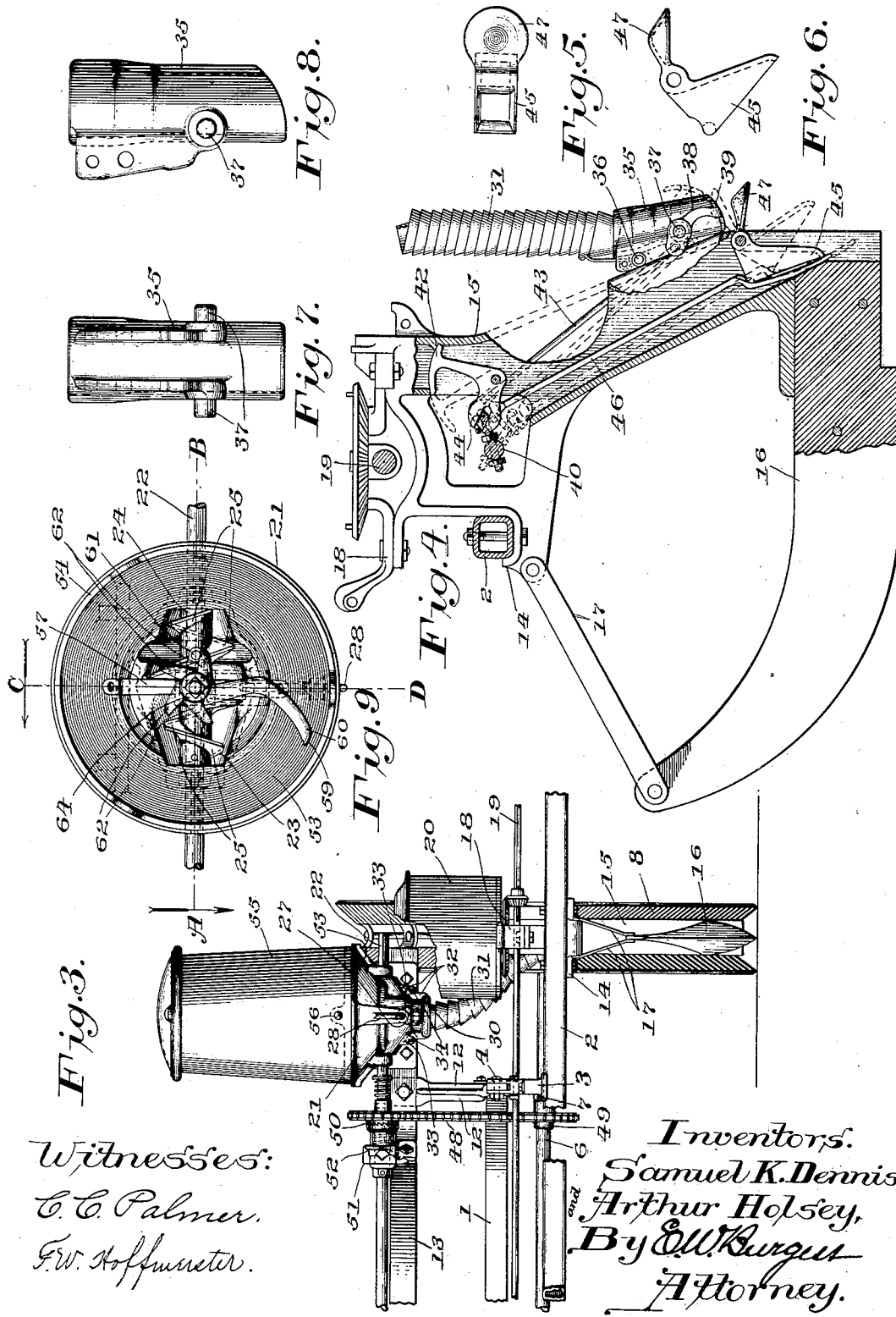

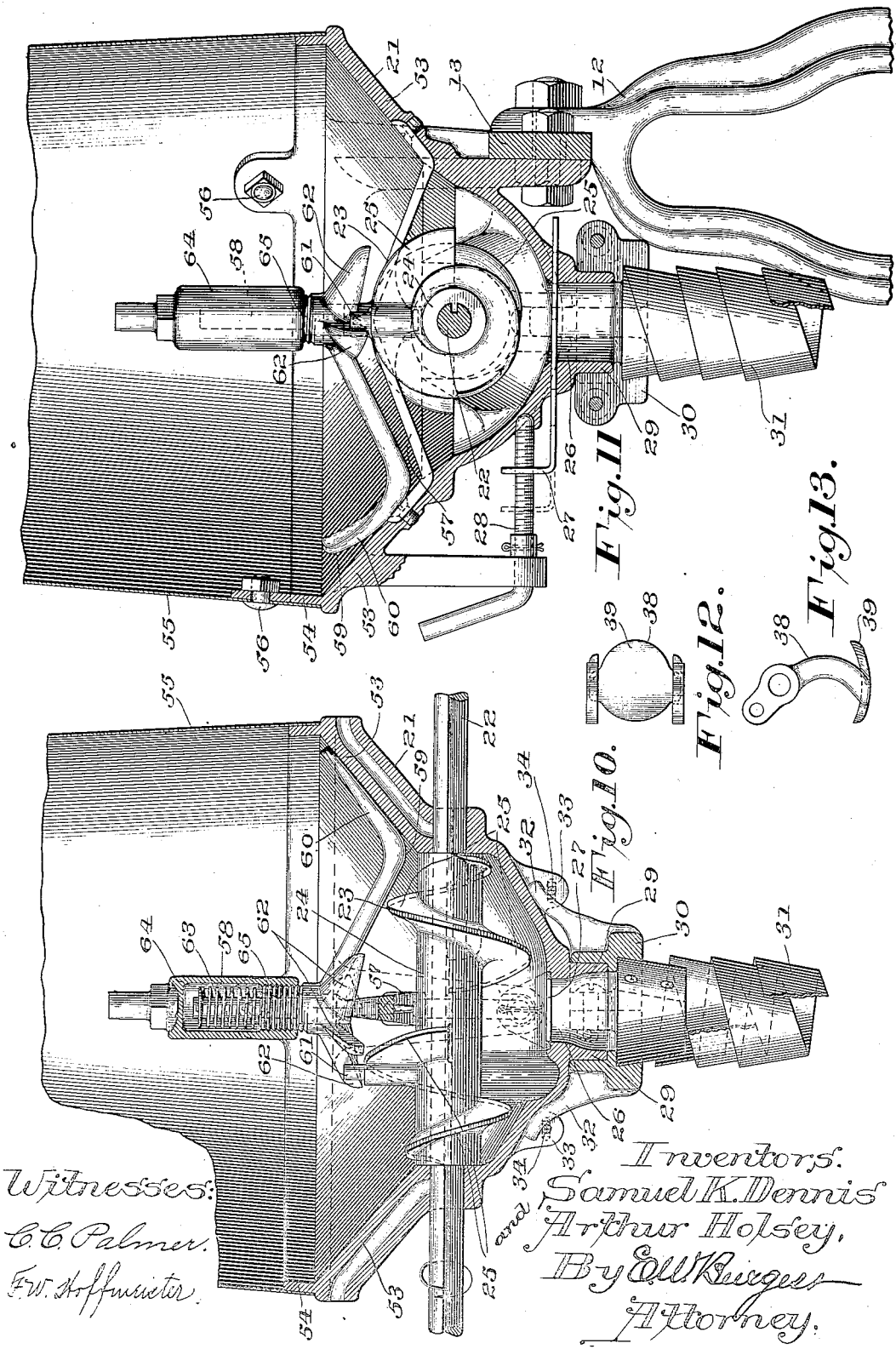

SAMUEL K. DENNIS AND ARTHUR HOLSEY, OF CHICAGO, ILLINOIS, ASSIGNORS TO INTERNATIONAL HARVESTER COMPANY, A CORPORATION OF NEW JERSEY.

FERTILIZER ATTACHMENT FOR CORN-PLANTERS.

1,041,976.      Specification of Letters Patent.      Patented Oct. 22, 1912.

Application filed June 29, 1912. Serial No. 706,562.

*To all whom it may concern:*

Be it known that we, SAMUEL K. DENNIS and ARTHUR HOLSEY, citizens of the United States, residing at Chicago, in the county of Cook and State of Illinois, have invented certain new and useful Improvements in Fertilizer Attachments for Corn-Planters, of which the following is a specification.

Our invention relates to fertilizer distributers, and in particular to such of the class that are operative in connection with corn planters for the purpose of distributing material at each hill, and having the movement of the parts thereof controlled by the planter mechanism; the object of our invention being to provide a mechanism that may be readily attached to or detached from the frame of the planter, quickly adjusted in a manner to regulate the quantity of material distributed and accurate and efficient in operation. We attain these objects by means of the mechanism illustrated by the accompanying drawings, in which—

Figure 1 represents a top plan view of a corn planter having our invention embodied in the construction thereof; Fig. 2 is a side elevation of Fig. 1, partly in section; Fig. 3 is a front elevation of part of the planter frame and designed to illustrate the manner of mounting the receptacle for the fertilizer thereon and connecting it with the seed delivery mechanism; Fig. 4 is a sectional side elevation of part of Fig. 3, on an enlarged scale, and designed to illustrate the operation of the valve mechanism for the fertilizer and the connection thereof with the seed controlling valves; Fig. 5 is a top plan view of a combined seed dropping and fertilizer distributing valve; Fig. 6 is a side elevation of Fig. 5; Fig. 7 is a plan view of the lower end of the fertilizer conduit; Fig. 8 is a side elevation of Fig. 7; Fig. 9 is a top plan view of a receptacle for fertilizer, designed to illustrate the construction of the mechanism; Fig. 10 is a vertical, sectional side elevation, on an enlarged scale, of Fig. 9 along line A—B; Fig. 11 is a vertical, sectional side elevation of Fig. 9 along line C—D; Fig. 12 is a top plan view of a fertilizer dropping valve; and Fig. 13 is a side elevation of Fig. 12.

The same reference characters designate like parts throughout the several views.

The combined corn planter and fertilizer distributer includes a wheeled frame 1, substantially U-shaped and having the front end thereof pivotally connected with a transverse member 2 of the draft and runner frame by means of draft brackets 3 and coupling pins 4, and 5 represents the draft tongue.

6 represents the driving axle journaled in bearings 7 carried by the wheeled frame and having traction wheels 8 secured to opposite ends thereof, and 9 represents a transverse member of the wheeled frame, upon which are mounted a hand lever 10 operative in a manner to control the relative positions of the runner and wheeled frames, and a foot lever 11 operatively connected with the seed dropping mechanism.

12 represents bracket members secured to the side members of the wheeled frame, arranged vertically and having secured to the upper ends thereof a transverse bar 13.

14 represents bracket members secured to opposite ends of member 2 of the runner frame and having integral therewith rearwardly inclined seed conduits 15, to the lower ends of which are secured the rear ends of furrow opening runners 16, the front ends of the runners being connected with the bracket members by means of bars 17.

18 represents base members secured to the upper ends of brackets 14 and having a feed shaft 19 journaled therein that may be connected with the seed delivery mechanism carried by the seed hoppers 20 in any preferred manner.

21 represents base members secured to opposite ends of bar 13 and having journaled therein a feed shaft 22, upon which are mounted feed worms 23, including sleeve members 24 having helically arranged ribs 25 thereon that are inclined in opposite directions axially from near the center of the sleeves and having gradually reduced diameters. The bottom of the base members conform in general shape to that of the feeding worms and are provided with central angular feed openings 26, the areas of which are controlled by means of sliding plate valves 27 mounted in the base members and operatively connected with adjusting screws 28. The feed openings are surrounded by depending flanges 29, to which are connected two-part coupling members 30, having the upper ends of flexible conduits 31 secured thereto, the coupling members being provided with laterally projecting wing members 32 that are received between ear members 33 integral with the base members and retained therein by means of pins 34.

35 represents short, cylindrical feed conduits that are secured to the lower ends of the rear walls of the seed conduits 15 by means of pins 36, having the lower ends of the flexible conduits secured thereto and provided with laterally projecting trunnion members 37, upon which are journaled rocking valves 38 having central web members 39 concentric with the axes of the trunnions and adapted to open and close the lower ends of the conduits 35.

40 represents the clutch tripping shaft of the planter mechanism controlled in a common way by a check wire 41, or by the foot lever 11.

42 represents a first drop seed valve mounted at the upper end of the seed conduit and operatively connected with the clutch tripping shaft, and 43 a rod having the lower end thereof connected with the rocking valve 38, and the upper end thereof to an arm 44 secured to the clutch tripping shaft, whereby the two sets of valves are actuated simultaneously.

45 represents a second drop seed valve pivotally mounted at the lower end of the seed conduit and actuated by means of a plunger bar 46, having the upper end thereof operatively connected with the clutch tripping shaft.

47 represents a rearwardly extending conical wing member integral with valve 45 at its upper end and operative as a deflector or spreader for the fertilizer as it is delivered from the lower end of the feed conduits 35, the spreader moving toward the conduit as the second drop valve is opened.

The fertilizer feed shaft 22 is operatively connected with the axle 6 of the planter by means of a sprocket chain 48 and sprocket members 49 and 50, upon the axle and feed shaft, respectively, and a clutch mechanism 51 carried by the feed shaft and controlled by a clutch tripping lever 52. The base members 21 of the fertilizer receptacle have outwardly and upwardly diverging walls 53 provided with annular flanges 54 at the upper ends thereof that receive the lower ends of cylindrical sheet metal fertilizer receivers 55 that are secured thereto by means of bolts 56.

57 represents a bridge member having opposite ends thereof secured to the diverging walls of the base members and provided with a vertically arranged stem 58, the axis of the stem being in vertical alinement with the feed opening 26, and rotatably mounted upon the stem is an agitator 59, having a curved finger portion 60 that turns in close proximity to the diverging walls of the base, the agitator being given intermittent rotation by means of a pin 61 carried by the feeder mechanism and engaging with radially extending wings 62 integral with the agitator. The agitator is slidably mounted upon the stem 58 and is yieldingly pressed downward by means of a spring 63 coiled about the reduced upper end of the stem and inclosed within a thimble 64 that is connected with an axially alined boss portion 65 integral with the agitator, the construction permitting the agitator to rise if the pin 61 does not engage properly therewith.

In operation the fertilizer is being constantly agitated above the feeding worms, and the latter move it toward the feed openings and it falls to the bottom of the feed conduits, that are closed by the valves 38, and when the seed dropping valves are actuated by the planter mechanism the valves 38 are rocked about their axes, permitting the material to pass over the conical spreaders carried by the second drop seed valve, whereby the material is directed outward from the periphery of the conical spreaders, but will not come in contact with the seed as it drops into the furrows.

What we claim as our invention, and desire to secure by Letters Patent, is:

1. A combined corn planter and fertilizer distributer having, in combination, a seed conduit, a second drop valve pivotally mounted at the lower end of said seed conduit, a fertilizer conduit in rear of said seed conduit, having a valve controlled opening at the lower end thereof, and a fertilizer spreader carried by said second drop valve, and adapted to receive the material from said fertilizer conduit.

2. A combined corn planter and fertilizer distributer having, in combination, a seed conduit, a second drop valve pivotally mounted at the lower end of said seed conduit, a fertilizer conduit in rear of said seed conduit, a valve mounted at the lower end of said fertilizer conduit, means for simultaneously operating said valves, and a conical spreader carried by said second drop valve and adapted to receive the material from said fertilizer conduit.

3. A combined corn planter and fertilizer distributer having, in combination, a seed conduit, a second drop valve pivotally mounted at the lower end of said seed conduit, a fertilizer conduit in rear of said seed conduit and including a flexible body portion and a rigid lower portion, said rigid portion being secured to the lower end of said seed conduit and provided with laterally projecting trunnions upon opposite sides thereof, a valve member including arms having one end journaled upon said trunnions and the opposite ends thereof connected by a curved plate concentric with the axis of said trunnions and adapted to open and close the lower end of said rigid portion, a conical spreader integral with said second drop valve and adapted to receive material from said fertilizer conduit, and means for simultaneously operating said valves.

4. A combined corn planter and fertilizer distributer having, in combination, seed dropping and fertilizer distributing elements actuated from a common source of power, said fertilizer distributing mechanism including a receptacle having a base portion provided with a feed opening in the bottom thereof, a shaft journaled in opposite walls of said base portion above said feed opening, said shaft being provided with oppositely inclined helically arranged ribs that terminate upon opposite sides of said feed opening and upon opposite sides of said shaft.

5. A combined corn planter and fertilizer distributer having, in combination, seed dropping and fertilizer distributing elements actuated from a common source of power, said fertilizer distributing mechanism including a receptacle having a base portion provided with a feed opening in the bottom thereof, a shaft journaled in opposite walls of said base portion above said feed opening, a sleeve secured to said shaft and extending from side to side of said base, said sleeve being provided upon opposite sides of the longitudinal center thereof with oppositely inclined helically arranged ribs having a gradually increasing radius from opposite ends of said sleeve toward the center thereof and terminating upon opposite sides of said feed opening and upon opposite sides of said sleeve.

6. A combined corn planter and fertilizer distributer having, in combination, seed dropping and fertilizer distributing elements actuated from a common source of power, said fertilizer distributing mechanism including a receptacle having a base portion provided with a feed opening centrally arranged in the bottom thereof, a shaft journaled in opposite walls of said base above said feed opening, said shaft being provided with oppositely inclined feeding members adapted to advance the material toward said feed opening, an agitator arm rotatably mounted in said receptacle above said feeding members, and means carried by said shaft and operative to impart intermittent rotation to said agitator.

7. A combined corn planter and fertilizer distributer having, in combination, seed dropping and fertilizer distributing elements actuated from a common source of power, said fertilizer distributing mechanism including a receptacle having a base portion provided with a feed opening centrally arranged in the bottom thereof, a shaft journaled in opposite walls of said base above said feed opening, said shaft being provided with oppositely inclined helically arranged feeding members adapted to advance the material toward said feed opening, an agitator arm rotatably mounted in said receptacle above said feeding members, having the axis thereof at right angles with the axis of said shaft, and means carried by said shaft and engaging with said agitator in a manner whereby intermittent rotation is imparted thereto.

8. A combined corn planter and fertilizer distributer having, in combination, seed dropping and fertilizer distributing elements actuated from a common source of power, said fertilizer distributing mechanism including a receptacle having a base portion provided with a feed opening centrally arranged in the bottom thereof, a shaft journaled in opposite walls of said base above said feed opening and provided with oppositely inclined helically arranged feeding members adapted to advance the material toward said feed opening, a bridge member having opposite ends thereof secured to the side walls of said base and provided with a vertically arranged stem having the axis thereof in alinement with said feed opening, an agitator arm rotatably mounted upon said stem in a manner permitting a limited upward movement thereof, and means carried by said shaft and engaging with said agitator in a manner whereby intermittent rotation is imparted thereto.

9. A combined corn planter and fertilizer distributer having, in combination, seed dropping and fertilizer distributing elements actuated from a common source of power, said fertilizer distributing mechanism including a receptacle provided with a base portion having a centrally arranged feed opening in the bottom thereof, a shaft journaled in opposite walls of said base above said feed opening and provided with feeding members adapted to move the material toward said feed opening, a bridge member having opposite ends thereof secured to the side walls of said base and provided with a vertically arranged stem having the axis thereof in alinement with said feed opening, an agitator arm rotatably mounted upon said stem and provided with a series of radially arranged wing portions, and a pin carried by said shaft and adapted to engage with said wings in a manner whereby intermittent rotation is imparted to said agitator.

10. A combined corn planter and fertilizer distributer having, in combination, seed dropping and fertilizer distributing elements actuated from a common source of power, said fertilizer distributing mechanism including a receptacle having a base portion provided with a centrally arranged feed opening in the bottom thereof, a shaft journaled in bearings carried by opposite walls of said base above said feed opening and provided with feeding members adapted to move the material toward said feed opening, a bridge member having opposite ends thereof secured to the side walls of said base and provided with a vertically arranged stem having the axis thereof in alinement with said feed opening, an agitator arm slidably and rotatably mounted upon said stem in a manner permitting a limited bodily movement thereof longitudinally upon said stem, said agitator having a series of radially arranged wings thereon, and a pin carried by said shaft and adapted to successively engage with said wings in a manner to transmit an intermittent rotary movement to said agitator.

11. A combined corn planter and fertilizer distributer having, in combination, seed dropping and fertilizer distributing elements actuated from a common source of power, said fertilizer distributing mechanism including a receptacle having a base portion provided with a centrally arranged feed opening in the bottom thereof, a shaft journaled in bearings carried by opposite walls of said base above said feed opening and provided with feeding members adapted to move the material toward said feed opening, a bridge member having opposite ends thereof secured to the side walls of said base and provided with a vertically arranged stem having the axis thereof in alinement with said feed opening, an agitator arm slidably and rotatably mounted upon said stem in a manner permitting a limited bodily movement thereof longitudinally upon said stem, a spring carried by said stem and operative to yieldingly press said agitator toward the axis of said shaft.

SAMUEL K. DENNIS.
ARTHUR HOLSEY.

Witnesses:
M. Van der Vliet,
Evan Evans.